L. M. BANKS.
TIRE.
APPLICATION FILED OCT. 25, 1916.
1,255,689.
Patented Feb. 5, 1918.
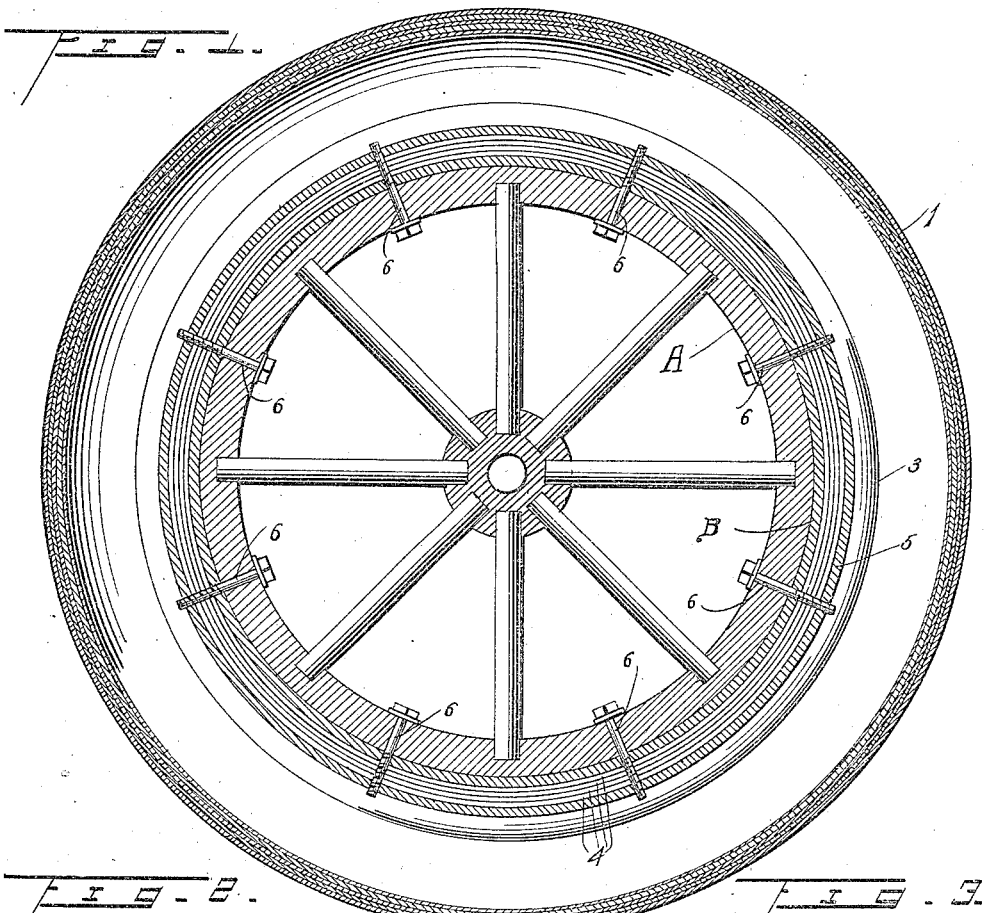
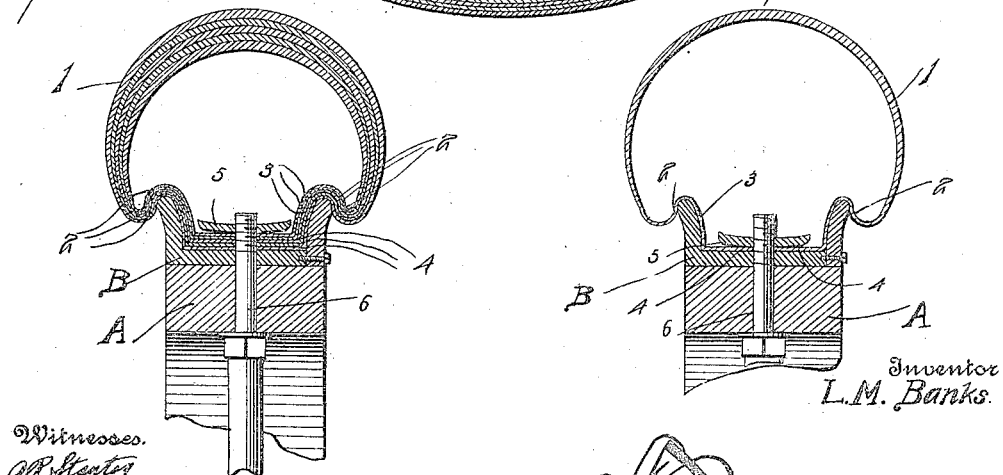
Witnesses
Inventor
L. M. Banks.
By
Attorney

UNITED STATES PATENT OFFICE.

LESLIE M. BANKS, OF MUSKOGEE, OKLAHOMA.

TIRE.

1,255,689. Specification of Letters Patent. Patented Feb. 5, 1918.

Application filed October 25, 1916. Serial No. 127,622.

*To all whom it may concern:*

Be it known that I, LESLIE M. BANKS, a citizen of the United States, residing at Muskogee, in the county of Muskogee and State of Oklahoma, have invented certain new and useful Improvements in Tires; and I do hereby declare the following to be a full, clear, and exact description of the invention, such as will enable others skilled in the art to which it appertains to make and use the same.

This invention relates to vehicle wheel tires, and the primary object of the invention is the provision of a tire formed of flexible metal, and designed to take the place of the ordinary pneumatic tire.

Another object of the invention is the provision of a metal tire, which will admit of the same cushioning effect being had as obtained from a pneumatic tire, the said metal tire being of such construction that it can be manufactured cheaply, and will be durable and efficient in operation.

Other objects will appear and be better understood from that embodiment of my invention of which the following is a specification, reference being had to the accompanying drawings forming a part thereof, in which:

Figure 1 is a vertical sectional view, taken through a vehicle wheel, and a tire constructed in accordance with my invention, Fig. 2 is a transverse sectional view, taken through the tire and the vehicle wheel felly, and Fig. 3 is a transverse view taken through a tire, constructed in accordance with my invention, but showing only one shell employed.

Referring to the drawings in detail, the letter A designates a vehicle wheel, having a channel rim B mounted on the felly of the wheel, the said rim B having one side thereof removable.

The tire is designated, as an entirety, by the numeral 1 and may consist of a plurality of nested metal shells, as shown in Figs. 1 and 2, or a single shell, as shown in Fig. 3. The shells forming the body of the tire are identical in construction, and each has the sides thereof bent inwardly and upwardly, as shown at 2, and thence continued downwardly, as at 3, and terminally bent in the direction of each other to provide horizontally disposed flanges 4.

When the tire is composed of a plurality of shells, as shown in Figs. 1 and 2, and mounted on the vehicle wheel, the portions 3 extend into the channel rim B, with the flanges 4 on the outermost shell resting on the inner wall of the channeled rim, and the points of connection between the portions 2 and 3 overlie the outer edges of the sides of the channel rim B. The walls of the shells are gradually thickened toward the tread portions so as to strengthen the tread portions and reinforce them against rapid wear. The meeting edges of the flanges 4 of the shells are formed with registering recesses and when the tire is formed of a plurality of shells, the recesses in the superposed flanges 4 register. The recesses in the flanges 4 also register with openings which extend through the felly of the wheel. A retaining band 5 is located within the tire and extends therearound, and is of substantially concavo-convex configuration in cross section, and rests upon the adjacent flanges 4. The band 5 has spaced openings therein, the walls of which are threaded, and the said openings register with the recesses in the adjacent flanges 4 and with the openings in the felly. Fastening bolts 6 have their shanks extending through the openings in the felly and the recesses in the flanges 4, and have their inner ends threadedly received by the openings in the band 5. The band 5 and the bolts 6 coöperate to hold the tire on the wheel rim B and against accidental removal.

In Fig. 3 of the drawings, the tire is shown as consisting of only one shell. This is sufficient when the tire is mounted on a wheel of a vehicle of light weight.

By virtue of constructing the shells of flexible metal, the tire will admit of the same cushioning effect being had as obtained from a pneumatic tire. It will also be evident that a tire constructed in the foregoing manner will be more durable than a pneumatic tire, and can be conveniently applied to a vehicle wheel.

Having thus described my invention what I claim as new, is:

1. The combination with a wheel rim, of a tire associated with the rim and having a body portion formed of flexible metal, the sides of the body being bent inwardly and upwardly and thence bent in the direction of the rim and further bent to provide opposed flanges extending around the rim, a circular band located within the tire and encircling the flanges, and bolts having their shanks extending through the rim, flanges and band for holding the tire on the rim.

2. The combination with a wheel rim of the channeled type, of a tire associated with the wheel rim and having its body portion formed of flexible metal and having the sides thereof bent inwardly and upwardly, and then downwardly in the direction of the rim and formed to provide flanges, said inwardly and upwardly bent portions overlying the rim laterally, fastening means operatively engaging the flanges and wheel rim for holding the tire on the rim.

In testimony whereof I affix my signature in presence of two witnesses.

LESLIE M. BANKS.

Witnesses:
J. J. BRUCE,
M. D. BLANTON.

Copies of this patent may be obtained for five cents each, by addressing the "Commissioner of Patents, Washington, D. C."